United States Patent [19]

Sizmann

[11] Patent Number: 4,484,617

[45] Date of Patent: Nov. 27, 1984

[54] METHOD OF USING AND STORING ENERGY FROM THE ENVIRONMENT

[75] Inventor: Rudolf Sizmann, Munich, Fed. Rep. of Germany

[73] Assignee: Didier-Werke AG, Wiesbaden, Fed. Rep. of Germany

[21] Appl. No.: 272,525

[22] Filed: Jun. 11, 1981

[30] Foreign Application Priority Data

Jun. 16, 1980 [DE] Fed. Rep. of Germany ....... 3022583

[51] Int. Cl.$^3$ .............................................. F28D 21/00
[52] U.S. Cl. .................................... 165/1; 165/104.12; 62/94; 62/112; 62/390
[58] Field of Search ............... 165/104.12; 62/94, 112, 62/480

[56] References Cited

U.S. PATENT DOCUMENTS 4,227,375 10/1980 Tompkins et al. ................. 165/4 X
4,272,268 6/1981 Greiner ............................. 62/480 X
4,291,755 9/1981 Minto .......................... 165/104.12 X Primary Examiner—Davis, Jr., Albert W.
Attorney, Agent, or Firm—Wenderoth, Lind & Ponack

[57] ABSTRACT

The present invention relates to a method of using and storing energy from the environment using a storage medium, especially silica gel or zeolite, which works by means of chemical reactions or sorptions, in which during charging with energy exergy is accumulated to a high density in this storage medium via an inert gaseous carrier medium for the exergy, and during discharging the stored exergy is extracted from the store, as required, also by means of an inert gaseous carrier medium for conversion into heat or cold of the desired level. The method of the present invention is carried out in such a way that:

(a) on charging with energy the exergy of smaller imbalances of the environment is accumulated and/or (b) on discharging energy the residual exergy contained in the emerging gaseous inert carrier medium is used for charging a further storage medium, in which no or only a little exergy is accumulated.

14 Claims, 5 Drawing Figures

METHOD OF USING AND STORING ENERGY FROM THE ENVIRONMENT

This invention relates to a method of using and storing energy from the environment using a storage medium which operates by means of chemical reactions or sorptions.

The use of energy from the environment and particularly solar radiation has already been proposed using a storage medium operating by means of chemical reactions or sorptions. Thus, for example, the storage of solar energy is described in a paper in Solar Energy, 23 (1979), pages 489 to 495, in which use is made of the heat of adsorption of moisture on zeolite molecular sieves. This publication states as a disadvantage that relatively high upper temperatures are necessary in order to utilise the maximum storage capacity of the zeolite material, for example 250° C., but nevertheless it is stated that storage of energy in zeolite is advantageous compared to storage in water, rocks or in latent heat stores. Further reaction systems for heat storage and heat transformation are described in VDI-Berichte No. 288 (1977), pages 111 to 114. Examples of such systems are:

Systems using ammonia:

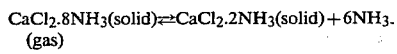

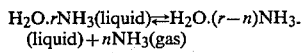

Systems using water:

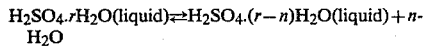

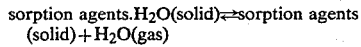

Sorption agents are, for example, molecular sieves such as natural or synthetic zeolites, silica gel and $CaCl_2$.

Further systems use methanol as the sorbable constituent.

In general these reactions or sorptions correspond to the following equation:

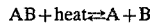

in which A corresponds to the storage medium in the energy-loaded state with reference to the constituent B, i.e. heat is released on reaction with or sorption of the constituent B.

So-called heat pump systems represent another method of using energy from the environment. However, in these systems electric current, for example, or high-temperature heat are converted into useful heat using the heat pump effect, so that in comparison with a direct conversion of this energy into heat a "heat increase" up to a factor of the order of magnitude of 3 can be achieved.

The utilisation of solar energy by means of solar collectors, as in the past, does however have great disadvantages, since at least at the degrees of latitude in Europe it has been thought that solar radiation is only sufficiently strong to be practically usable in summer, so that storage of the energy trapped by solar collectors is necessary. However, this storage presents considerable problems, since either it is only possible to provide short-term storage, for example, in sufficiently large water reservoirs with correspondingly costly insulation, or it is necessary to use special and therefore technically costly solar collectors if long-term storage is required, since in this case the high temperatures referred to above are considered necessary for complete regeneration of a store. In addition, regeneration of such a long-term store is in practice only possible in the summer months with strong direct solar radiation, so that the store must have capacity for all the winter months if it is to represent the only heat source.

It is an object of the present invention to utilize energy from the environment in a manner which deviates from hitherto applied solutions and which constitutes a novel process for the utilization of energy from the environment.

This method of the present invention of using energy from the environment of the type described above is characterized in that (a) on charging with energy the exergy of smaller imbalances of the environment is accumulated and/or (b) on discharging energy the residual exergy contained in the emerging gaseous inert carrier medium is used for charging a further storage medium, in which no or only a little exergy is accumulated.

Advantageous embodiments of the method of the present invention are defined in greater detail below.

The invention also relates to the use of such methods to meet the heating and/or cooling requirements of buildings or vehicles or vehicle parts or for hot water supply or to meet the heat requirement for preheating of combustion engines.

The method according to the invention is particularly applicable in the low temperature range, i.e. at temperatures around and below 100° C.

The expression "exergy" used in the description originates from the field of thermodynamics and means the free enthalpy or technical capacity for work of a system, relative to the conditions of the surroundings. "Exergy" is energy which can be converted into other forms of energy. The expression "anergy", which also originates from thermodynamics, means non-convertible energy, for example the caloric energy of the environment. (For a definition see Lueger, "Lexikon der Technik", Verfahrenstechnik, Vol. 1, pages 128/129 (1972)).

In the known use of zeolite stores or other sorption stores it has been considered necessary to charge the store with energy at high temperatures.

Surprisingly, it has now been found that it is also possible to regenerate such sorption stores at substantially lower temperatures than were previously considered necessary. Regeneration of such a sorption store is possible, for example, at ambient temperatures or even at temperatures lower than ambient temperature. It has also been found that it is possible to regenerate such stores by using an inert gas with a moisture deficit so long as the stores are operated with water as a volatile constituent.

The expression "exergy of small imbalances in the environment" used in the description should therefore be understood to mean conditions in which no great temperature differences prevail, such as for example remote heat, waste heat, heat of combustion, heat of fermentation, the temperature level of which can be relatively low, e.g. below 50° C. and even below 40° C. Because the accumulation of energy in the storage medium is variable with time and can be interrupted at any time, the availability of the heat sources should be planned not for a possible temporary peak demand for heat but for the mean annual figure for heat requirements. "Smaller imbalances in the environment" should therefore be understood to mean those imbalances which in the past have not been used in long-term storage, e.g. those which could only be used with the aid of heat pumps for boosting to a higher temperature level. Thus, the charging of a store using solar collectors can be carried on, for example, with limited solar radiation, as occurs in winter, during periods of bad weather or early in the morning, or late in the evening, although the heat which accumulates in the solar collector is at a temperature level which is so low that it is not usable for direct heat supply. This property, namely, that heat can be used at a temperature below the temperature at which it is useful on extraction of the exergy for conversion into heat from the storage medium, the chemical heat pump effect which is known per se being utilized here, offers the further advantage that it is posible to reduce the volume of year-long stores for solar energy for use for example for heating purposes.

The second great advantage of the method according to the invention is the use of residual exergy to charge a further storage medium whereby a quite considerably increased use of the energy taken from the environment or the surroundings may be possible, so that amongst other things, again, the volume of storage medium can be substantially reduced since discharged storage medium can be simultaneously recharged during extraction of exergy and may then again be available for extraction of exergy. This use of residual exergy can, of course, also be used when energy charging is carried out in a conventional manner, e.g. when a storage medium such as zeolite is regenerated with air at 250° C.

A method according to the invention may be carried out particularly advantageously when working with a column apparatus and using a solid storage medium in a batch process, since then the efficiency may be particularly good and it is also possible to limit the extraneous energy necessary for carrying out the process for pumping the inert gaseous carrier medium. When a solid storage medium is used, the height of a column should preferably be between 0.5 and 2 m and particularly 0.75 to 1.5 m in order to minimize the pressure losses occurring during transport of the carrier medium. In general, however, it may be said that this extraneous or parasitic energy for transport of the carrier medium and also the extraneous energy for pumping a fluid working medium and a storage medium is small by comparison with the storable energy, being only of the order of a few percent of this storable energy.

It is particularly advantageous if water is used as the sorbable substance, since this is generally in almost unlimited supply and the method can be carried out open to the atmosphere. When other sorbable substances such as ammonia or methanol are used it is naturally necessary to carry out the method according to the invention in a circulatory system which is closed to the atmosphere, but this only requires the additional use of corresponding heat exchangers. However, operation of a closed system for carrying out the method according to the invention is conveniently used only in the utilisation of the exergy of small imbalances in the form of temperature differences.

If the method according to the invention is to be used to obtain exergy from the storage medium by conversion into "cold", this "cold" may be taken in the form of "cold" due to the evaporation which occurs when the liquid sorbable constituent is absorbed from the charged storage medium. For this it may merely be necessary to bring a container with the liquid sorbable constituent into gas contact with the regenerated storage medium.

The invention may be carried into practice in various ways and some embodiments will not be described by way of example in the following description, in which certain results obtained from experiments are set out, and with reference to the accompanying drawings in which.

Figure 1:
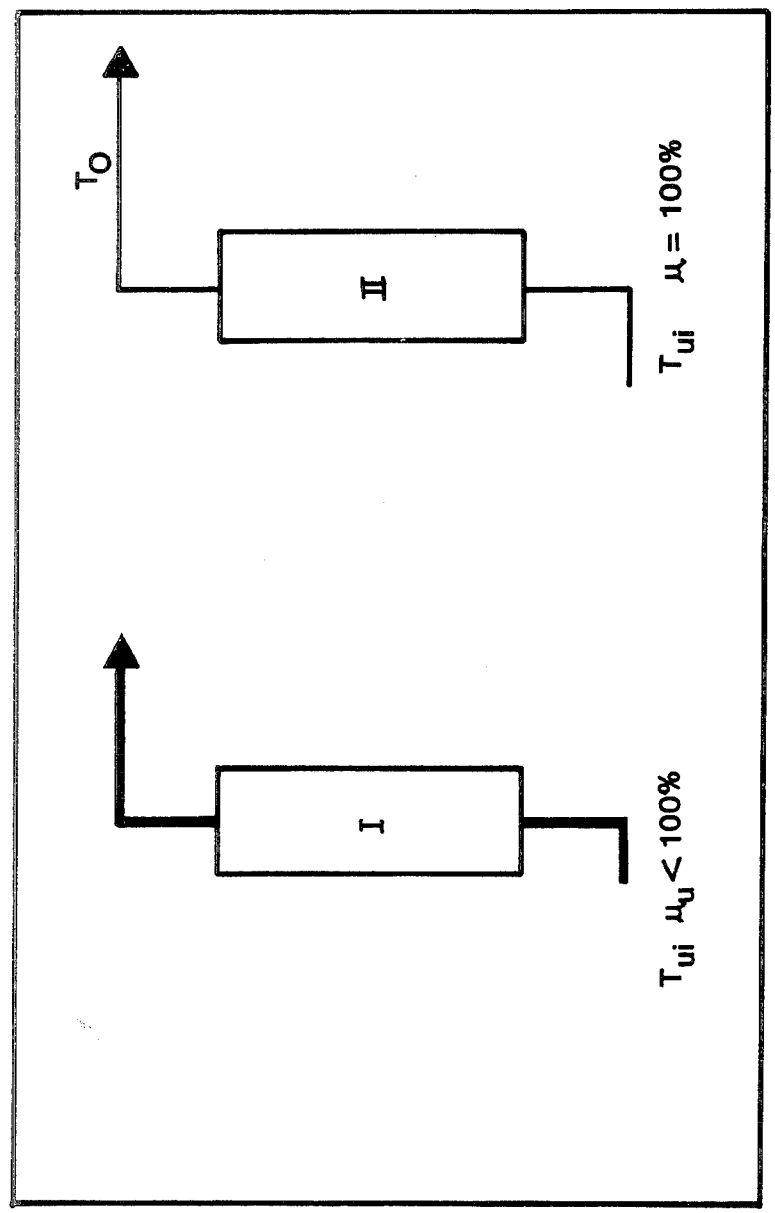
FIG. 1 is a flow diagram in which the storage medium is shown in two different states.

The storage medium I shown in FIG. 1 contains zeolite charged with water vapour, i.e. with energy discharged. Air from the surroundings which is as dry as possible and has a relative humidity $\tau_u$ and a temperature $T_u$ is passed through this column from below. The column I also serves as a storage container.

As already described above, even at the ambient temperature at which the storage medium I finds itself, for example 20° C., water vapour is desorbed from the zeolite and led off with the air current. The heat of desorption is removed from the gas current when the process is carried out adiabatically, i.e. with the column I insulated, or must be continuously supplied to the column I as ambient heat (anergy) when the process is carried out isothermally. Finally, an equilibrium is set up between the water charge n of the zeolite and the water vapour partial pressure $p_w$ of the air current supplied from the outside. The water charge n becomes smaller the smaller $p_w$ and the higher the ambient temperature $T_u$ are, the quantitative interrelation depending upon the type of zeolite used. As an example for a zeolite of the X type, when $T_u=25°$ C. a reduction in the water charge of 27% is achieved, i.e. from 0.29 g water/g zeolite at $\tau=100\%$ to 0.21 g water/g zeolite at $\tau_u=10\%$. Such dry surrounding air may be available under special weather conditions and in certain arid zones.

Because of the nature of the integral heat of adsorption of this type of zeolite, this corresponds to an energy charge of 21% of the total store capacity.

Following the "drying" of the storage medium I in the column I the dry medium is available as storage medium II in the column II, as shown on the right in FIG. 1. When ambient air with 100% relative humidity is passed through, the energy stored in the storage medium II above the heat of condensation and adsorption of water vapour on zeolite can be used to raise the temperature of the air from $T_u$ to $T_o$. The 100% humid air can be produced in a known manner by humidifying ambient air, for example by simply passing air through or over water, the necessary heat of evaporation of the water being absorbed from the surroundings at the temperature $T_u$, i.e. as anergy.

Naturally, it is also possible for the ambient air with a moisture deficiency supplied to the storage medium to be supplied with additional heat at a low temperature level, e.g. from a solar collector or in heat exchange from used hot water from domestic or other sources or from other heat sources at a low temperature level, whereby the efficiency of the energy charging of the store can be further increased.

Figure 2:
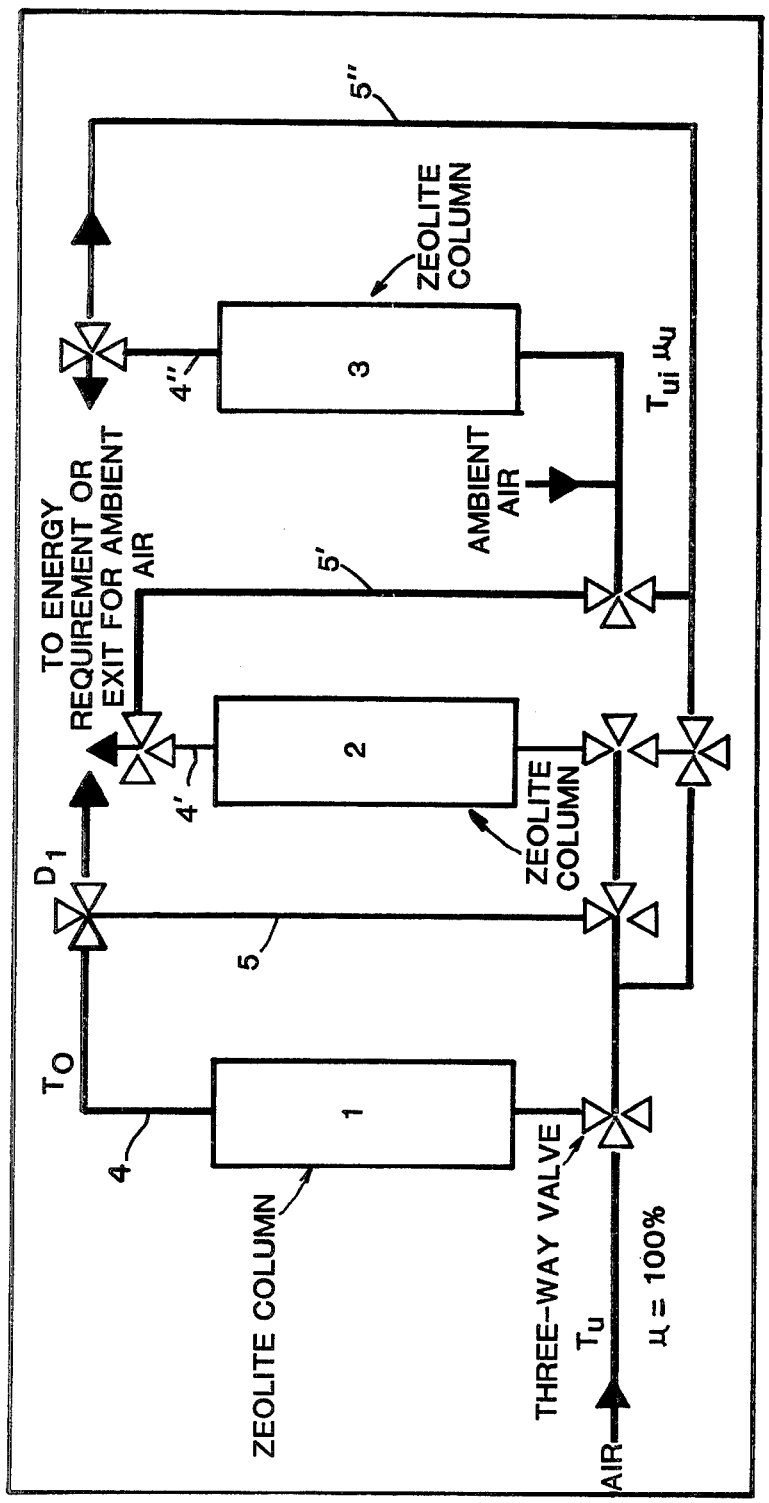
FIG. 2 is a flow diagram of an embodiment of the method according to the invention in which a working medium is used.

FIG. 2 shows a flow diagram of the process of the present invention using a working medium. As a solid water-absorbing storage medium a zeolite again is used from which adsorptively bound water is removed by a dry air current. The storage medium is charged with energy by the desorption of water with respect to the reverse reaction of the adsorption of water vapor. The dry air current necessary for charging the storage medium with energy is obtained with the aid of a working medium, which in the present case is also a zeolite, from the difference in exergy between ambient air which is not fully saturated with water vapour and has a relative humidity of $\tau_u < 100\%$ and ambient temperature $T_u$ and ambient air which is fully saturated with water vapour and has a relative humidity $\tau = 100\%$ and ambient temperature $T_u$. The 100% humid air can be obtained in the manner described above by humidification of ambient air while meeting the heat of evaporation requirement from the anergy of the environment.

At the commencement of operation there is dry zeolite in the column 1 (FIG. 2). When air saturated with water vapour is passed through the result is hot dry air at a temperature $T_o$. It was found in tests that with air at $T_u = 20°$ C. a temperature of $T_o = 85°$ C. was obtained in the air 4 emerging from the storage medium 1. The heat is produced in the adsorption of the water vapour on the zeolite and with this method the adsorption front advances more or less sharply upwards from below in the storage medium 1, i.e. a quasi counterflow principle prevails. The column is thermally insulated.

A branch current 5 of hot dry air is passed via a continuously adjustable three-way valve $D_1$ to a second column 2 containing a storage medium. The storage medium comprises zeolite which has previously been brought to a low water charge by passing through it ambient air which is as dry as possible having a relative humidity $\tau < 100\%$, which can be achieved with the aid of the column 3 of FIG. 2. Thus, a branch of the gaseous inert carrier medium from the column 1 is sufficient for water desorption from column 2 so that the residual current of this dry air from the column 1 can be used to charge the storage medium with energy. The distribution ratio of useful current/total current of dry air is more advantageous the lower the water charge in column 2, i.e. the drier the available air.

When the adsorption front in column 1 has reached the top, the zeolite in column 2 should have been relieved of its water charge using the correct distribution ratio. Column 2 is then switched to the position of column 1, column 3 to the position of column 2 and column 1 to the position of column 3, wherein streams 4' and 4" correspond to stream 4, and streams 5' and 5" correspond to stream 5. In this way an almost continuous operation is possible. As a consequence of losses and irreversibilities and in order to ensure an advantageous and economic operation as regards the consumption of extraneous energy for air circulation in relation to the energy obtained and stored, the relative humidity $\tau_u$ of the ambient air should be as low as possible and should not for example exceed 55%.

Since interruption of the exergy storage is possible at any time, the method can be carried out in such a way that, by the use of suitable automatic control devices, the plant can be switched off at values of $\tau > 55\%$ of the ambient air and then only switched on again automatically when $\tau < 55\%$ is reached in the ambient air.

Figure 3:
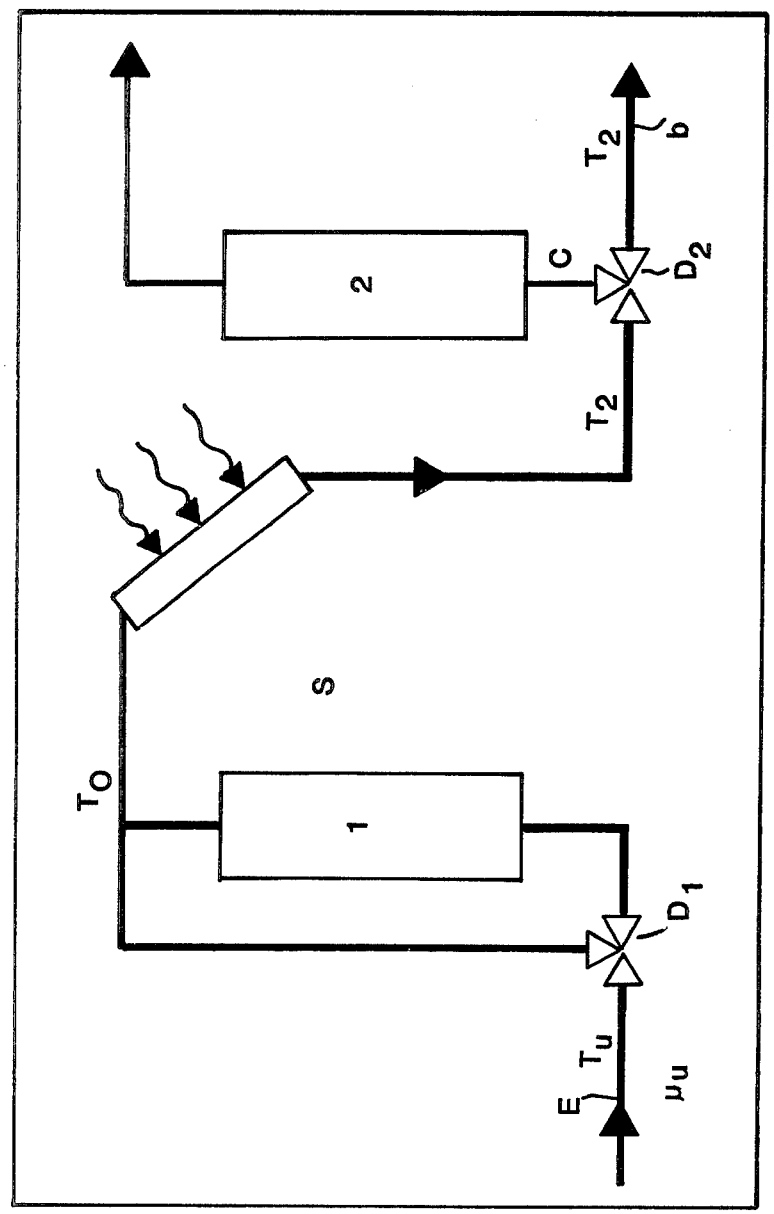
FIG. 3 is a flow diagram of an embodiment of the method according to the invention in which a working medium is used and additional energy is supplied by a solar collector.

FIG. 3 shows a method using zeolite as the working medium with water as the sorbable volatile constituent and air as the carrier medium to produce the exergy-rich, dry and warm air required for charging the storage medium with energy. The storage medium can be zeolite or sulphuric acid or another hygroscopic substance.

Columns 1 and 2 are filled with zeolite as the working medium. Air from the surroundings, which should have the lowest possible water content, is led through column 1 which contains dry zeolite. In this way it is freed of water vapour and by the heat of condensation and adsorption from this sorption process it is raised from the temperature $T_u$ prevailing at the inlet to the higher temperature $T_o$. Then its temperature is further increased in a solar collector S to $T_2$. The warm dry air then passes through column 2 which contains zeolite charged with water vapour. Finally, the air leaves the column 2 charged with water vapour. As a consequence of the temperature difference $T_2 - T_o$ the water adsorbed on the zeolite is removed from column 2 more rapidly than column 1 is humidified by the water content of the ambient air which is drawn in with a relative humidity $\tau_u$. It is therefore possible with one method to pass only a branch current through column 2, this branch current being dispensed using control engineering methods via the three-way tap $D_2$ so that column 2 is dry when column 1 is just adsorptively fully charged with water. If the columns 1 and 2 are then interchanged in the flow route a constant air drying and heating operation, i.e. action of exergy on the carrier medium, is possible. The remaining quantity of dry warm air is drawn off via the three-way valve $D_2$ through the pipe b and is available for the transfer of exergy to the actual store with the storage medium.

In another method of producing dry warm air the whole air current is passed through the column 2 at first until the working medium is rapidly and fully desorbed of water, and then the complete current is available as useful current for the storage medium until the column 1 is fully charged with water. Then the columns 1 and 2 are interchanged and the cycle is recommenced. For heat coupling the solar collector S can also be placed at the position E of FIG. 3. When the external air is at low absolute humidity and/or there is high solar radiation or for initial predrying of the storage medium it can be sufficient and advantageous from the point of view of process engineering to circumvent the column 1 completely or partially via the three-way tap $D_1$.

Instead of a batch process with periodic interchanging of the columns 1 and 2, in a quasi-counterflow operation, the use of a liquid hygroscopic working medium makes a true counterflow operation possible in which the liquid working medium, e.g. sulphuric acid, is continuously pumped around.

The consumption of extraneous energy for circulation of the carrier medium air, in relation to the energy charge stored thereby becomes smaller the lower the relative humidity $\tau_u$ of the inlet air and the higher the temperature $T_2$. In order to reduce heat losses and losses from resistances to flow it is advantageous to use a solid medium in the form of a number of columns which have not been filled to a very high level so that no excessive pressure losses occur, and these columns are used one after another chronologically for charging or discharging.

In the methods according to FIGS. 1, 2 and 3, examples are shown in which the storage medium can be charged with energy from small imbalances in the environment such as temperatures below 100° C., which may be as low as 60° C. or 40° C., or low-power solar radiation. In the examples, exergy is introduced into or accumulated in a hygroscopic storage medium by desorption of water vapour with the aid of a dry and/or warm inert gas current as a carrier medium which can be produced in various ways. This method can be described as continuous transfer of exergy from the flowing carrier gas to the storage medium and thus as a continuous accumulation of exergy in the storage medium. An additional state of imbalance is air with relative humidity $\tau \leq 55\%$. In the methods described below for obtaining useful heat at a higher temperature, particularly to meet the heating requirements of buildings or motor vehicles or vehicle parts or for hot water supply or to meet the heat requirement for preheating of combustion engines from the exergy content of the storage medium, it is irrelevant from which environmental source exergy introduced by the carrier gas into the storage medium is accumulated. Therefore the methods described make it possible for useful heat to be obtained from the store at higher temperatures, such as for example of the order of magnitude of 100° C., than were available to charge the store.

Thus it is possible to continue charging the store using solar collectors for example with limited wintry solar radiation or solar radiation during overcast weather, although heat only accumulates in the solar collector at such a low temperature level that it would not have been suitable for direct heat supply or heat use.

Step (b) of the method of the invention now will be described in more detail.

Figure 4:
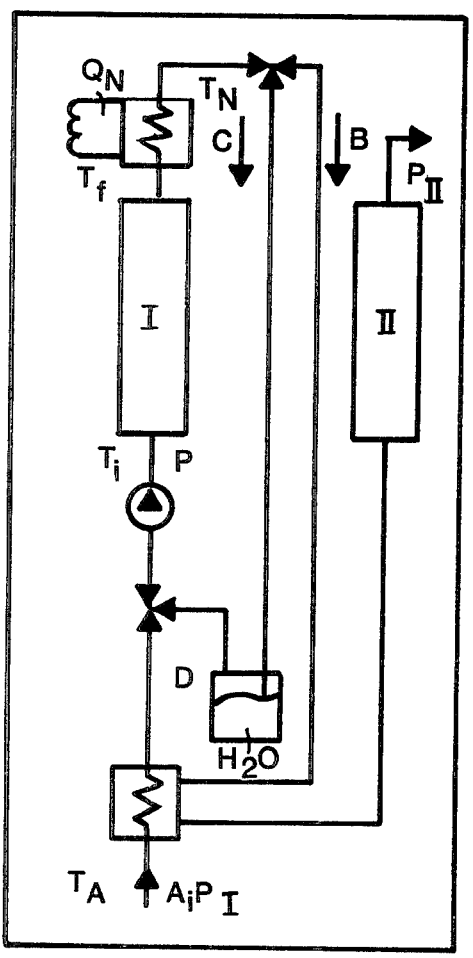
FIG. 4 is a flow diagram of an embodiment of the method according to the invention which shows in greater detail how useful heat may be obtained using a closed or an open circulatory system.

For the production of useful heat by means of the exergy accumulated in the storage medium it is possible to use either a closed circulation or, particularly when hygroscopic storage mediums are used, an open circulation of the carrier medium. These methods are shown in FIG. 4.

Ambient air with 100% relative humidity, which is produced by humidification and so assimilation of heat of vaporization from the environment at ambient temperature (use of anergy), is introduced at A into the column I which contains a dry, i.e. energy-charged, hygroscopic storage medium, preferably zeolite or sulphuric acid. The water vapour is absorbed in a sharp front which advances upwards as air is continually supplied through the storage column. When a solid storage medium is used the operation again follows a quasi-counterflow principle. When a liquid hygroscopic carrier medium such as sulphuric acid is used, it can be kept stationary by pumping, in which case it follows a counterflow principle in a gas-liquid system. When, in the case of a solid storage medium, the adsorption front has reached the upper end of the column I and thus the exergy has been completely removed from the column I, the air current is switched over to the next energy-charged column.

The air flowing off has a temperature $T_f$ which is higher than its inlet temperature $T_A$ because the total heat of condensation and adsorption of its original water vapour content will have been removed. Useful heat $Q_N$ is drawn off in a subsequent heat exchanger, for example for heating purposes, and the air current $T_f$ cools to $T_N$. $T_N$ is the lowest temperature at which useful heat can be used and for heating purposes this value is for example 30° C. In relation to the inlet temperature $T_A$ which will generally correspond to the (cold) ambient temperature, the remaining air current still has residual heat energy which can be recovered in a heat exchanger by passing it through the pipe B. In this way the inlet temperature $T_i$ of the inlet air from the column I can be increased, and in consequence $T_f$ can also be increased. The temperature level $T_N$ of the useful heat can be freely selected and is dependent in this method upon the positive temperature difference $T_f - T_i$, apart from temperature losses in the lower heat exchanger.

For example in tests using zeolite as the storage medium, with $T_A = 10°$ C. and $T_N = 30°$ C. a value was found for $T_f = 65°$ C., at a starting temperature $T_A = 0°$ C. with $T_N = 30°$ C. a value was obtained for $T_f = 47°$ C. and at $T_A = -5°$ C. with $T_N = 30°$ C. a value was obtained for $T_f = 41°$ C.

The exhaust air obtained by this method via the pipe B is dry after leaving the lower heat exchanger and thus still contains exergy with regard to the sorption of water vapour on hygroscopic storage mediums. This residual exergy of the carrier medium can be accumulated by passing it for example through a column II of a storage medium which is already charged with water vapour, i.e. with energy already discharged. The air flowing out of this column then carries water vapour with it so that exergy is accumulated in the column II. It was found, for example, in a thermally insulated column with zeolite as storage medium that for an inlet temperature of 10° C. of the hot air from the lower heat exchanger into the column II the temperature of the air leaving the column II was close to 0° C. and that this air had a water vapour partial pressure $p_{II}$ of approximately 5 mbars.

Using this method, therefore, with the same useful heat production being obtained from the hygroscopic storage medium a water charge, is reduced on average by the ratio $$f = (P_I - P_{II})/P_I$$

in which $P_I$ represents the water vapour partial pressure of the inlet air at A. With $P_I = 12.3$ mbar, i.e. the saturation vapour pressure for water at 10° C., and a value of $P_{II} = 5$ mbar this gives the value $f = 0.6$, which corresponds to an effective increase in storage capacity by the factor 1.67.

For the figures given this means that on 1 volume of store being used in the discharging of exergy, 0.6 volume parts of another storage medium are recharged with exergy, i.e. are additionally available in the cycle.

With isothermal operation of the column II still higher factors can be obtained for the increase in storage capacity.

In FIG. 4 an alternative closed circulation of the carrier medium is represented by C-D. Useful heat $Q_N$ is obtained exclusively from the energy stored in the medium in the column I. The advantage of the open circulation, as shown by the path A-B in FIG. 4, is that the high latent heat of vaporation which is taken from the environment by the water vapour which enters the column I with the inlet air is additionally obtained as useful heat, i.e. a chemical heat pumping effect is used.

For a zeolite of the X type the useful heat which can be obtained per 1 zeolite storage medium is as follows:

1. With an internally closed circulation C-D according to FIG. 4: $Q_N=0.12$ kWh/liter zeolite.
2. Using humid inlet air in the open circulation A-B according to FIG. 4: $Q_N=0.26$ kWh/liter zeolite.
3. Carrying out the method over the path A-B in case 2, but using the residual exergy of the dry exhaust air with adiabatic column II: $Q_N=0.42$ kWh/liter zeolite.

In the tests described above, which were carried out on a laboratory scale, columns with an internal diameter of 3.0 cm for the storge medium with a zeolite filling of 1 m high were used and for the working medium the same columns were used but with a zeolite filling of 60 cm high. When sulphuric acid was used as storage medium or as working medium the tests were carried out in columns of 3.0 cm internal diameter which were filled with Raschig rings as a packing.

Figure 5:
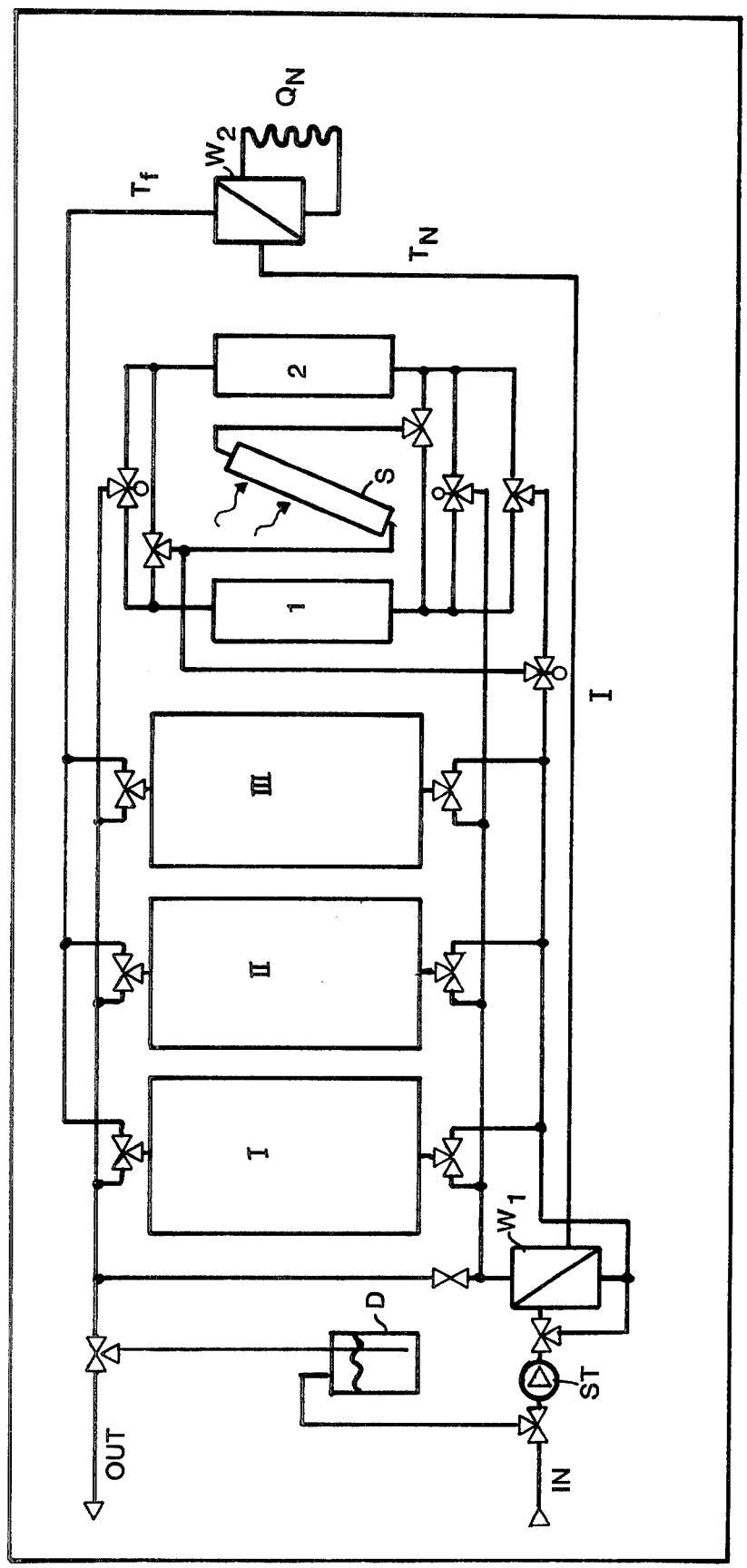
FIG. 5 is a flow diagram for a plant for heating buildings operating in accordance with the method according to the invention.

FIG. 5 shows schematically the construction and layout of a plant for carrying out the method according to the invention, in which the useful heat can be used for heating purposes.

Ambient air which is as dry as possible is supplied to the plant at "EIN" and leaves "AUS".

"ST" represents the fan for circulating the carrier medium, i.e. air. D is a water humidifier for water vapour saturation.

$W_1$ corresponds to the lower heat exchanger of FIG. 4, I, II and III are zeolite storage columns, 1 and 2 are columns for working medium, in the present case also filled with zeolite, S is a solar collector and $W_2$ is the heat exchanger for extraction of the useful energy. The advantage of this plant with several zeolite stores is that by corresponding switching of the three-way valves one store, for example column I, can be operated as a store supplying heat, while in column II the exergy present in the air emerging from the column I is further utilised, also column III can be charged with energy when there is appropriate solar radiation and the drying system is operated with the columns I and II with working medium.

In order to assess a system operating by the method according to the invention it may be stated that in Europe the solar radiation at about 50 degrees of latitude is approximately 1100 kWh m$^{-2}$ a$^{-1}$. The ratio of the mean radiation in July compared to January is approximately 8:1. A standard single-family house with full heat insulation requires approximately 25,000 kWh a$^{-1}$, for which a collector surface of approximately 75 m$^2$ would be necessary. A tank for storge of one year's supply of hot water would have an unreal size of approximately 400 m$^3$ at a hypothetical annular cycle of 1.5. The (practical) heating oil equivalent for such a store would be approximately 3m$^3$ a$^{-1}$.

When the method according to the invention is applied, using a store operating with zeolite, a store capacity of 20 m$^3$ is obtained at an annual cycle of 1.5 when the method of operation A-B according to FIG. 4 is carried out using the residual exergy of the dry exhaust air. If one proceeds on the assumption that by using solar radiation in the transitional months before and after the winter and during winter itself a cycle of over 2 can be achieved, the size of the store would be reduced to 15 m$^3$ zeolite. Naturally, such a quantity of zeolite would advantageously be divided into a large number of storage columns, for example up to 20 storage columns. Using the method according to the invention, therefore, it is possible also to use sorption materials such as zeolite for heating single-family houses, since on the one hand low temperature sources can be used for charging the zeolite store and on the other hand on discharge of the zeolite store by the use of the residual exergy it is possible to obtain an energy yield which is approximately 70% higher in the form of heat.

It has been found to be advantageous to use silica gel and particularly fine-pored silica gel as storage and working medium.

Using the method according to FIG. 1, air with a relative humidity of $\tau=3.2\%$ and a temperature $T_u=75°$ C. was introduced into a column I. The column I contained fine-pored silica gel which was charged with water vapour, i.e. with energy discharged, its water content being 39 parts by weight water on 100 parts by weight dry silica gel. When the air was passed through it this silica gel in the column I was dried to a water content of 2.7 parts by weight on 100 parts by weight of dry silica gel. Air having a temperature $T_u=75°$ C. and $\tau_{u}=3.2\%$ was produced from ambient air at 20° C. and a relative humidity of $\tau=52.6\%$, this ambient air having been heated in a solar collector to 75° C. Such ambient air is available without difficulty in summer during strong solar radiation at which the desired temperature increase to 75° C. is also possible in a solar collector.

A silica gel which is dried in this way to a water content of 2.7 parts by weight, i.e. charged with energy, can be stored for as long as required and when it is acted upon in accordance with FIG. 1 as column II by ambient air with $T_u=10°$ C. and $\tau=100\%$ it supplies an upper temperature $T_o$ at the outlet from the column II of approximately 40° C. This is sufficient for heating purposes, for example for buildings during the cold season.

We claim:

1. In a method of storing or using energy from the environment using a storage medium which works by means of chemical reactions or sorptions, in which during charging with energy, exergy of imbalances of temperature or humidity of the environment is accumulated in said storage medium by desorption of a volatile constituent, which is sorptively bound to said storage medium, by an inert gaseous carrier medium, said carrier medium containing none or substantially none of said sorbable volatile constituent but collecting said bound volatile constituent when said carrier medium is passed through said storage medium; or in which during discharging stored energy the stored exergy is extracted from the store as required for conversion into heat or cold of the desired level by passing an inert gas current charged with a sorbable constituent in a higher concentration than in said desorption step through the desorbed storage medium, the improvement wherein:
   (a) on charging with energy, said inert gaseous carrier medium, before being introduced into said storage medium, is first passed through a working medium which is comparatively free of sorbable constituent so that the sorbable constituent content of said carrier medium is further reduced, and a branch current of said carrier medium freed of said sorbable constituent is used for energy charging of another portion of said working medium and the remaining branch current of said carrier medium is used for desorption of said storage medium, or (b) on discharging energy, the residual exergy contained in the emerging gaseous inert carrier medium is used for charging a further storage medium, in which no or substantially no exergy is accumulated, by passing said emerging gaseous inert carrier medium through a storage medium charged with sorbable constituent for complete or partial desorption of said sorbable constituent.

2. A method as defined in claim 1, wherein heat is supplied to said inert gaseous carrier medium before said carrier medium is passed through said working medium in step (a).

3. A method as defined in claim 2, wherein said heat is heat which has been accumulated by a solar collector.

4. A method as defined in claim 2, wherein in step (a) heat is used at a temperature below the temperature at which heat is used in step (b) on extraction of the exergy in the form of heat from said storage medium.

5. A method as defined in claim 1, 2 or 4, wherein a hygroscopic substance is used as said storage medium, water is used as said sorbable volatile constituent, and air is used as said carrier medium.

6. A method as defined in claim 5, wherein silica gel is used as said storage medium.

7. A method as defined in claim 5, wherein a zeolite is used as said storage medium.

8. A method as defined in claim 5, wherein sulphuric acid is used as said storage medium.

9. A method as defined in claim 1, 2 or 4, wherein a zeolite is used as said working medium.

10. A method as defined in claim 1, wherein sulphuric acid is used as said working medium.

11. A method as defined in claim 1, wherein the accumulation of the exergy in said storage medium or the extraction of the exergy from said storage medium or the freeing of said carrier medium of said sorbable volatile constituent in said working medium and regeneration thereof are carried out according to a counterflow process.

12. A method as defined in claim 11, wherein when a solid working medium is used, it is used in a batch process.

13. A method as defined in claim 1, to meet the heating or cooling requirements of buildings or vehicles or for hot water supply.

14. A method as defined in claim 1, to meet the heat requirement for preheating a combustion engine.

* * * * *